No. 719,497. PATENTED FEB. 3, 1903.
J. W. NUTSCH.
STALK CUTTER.
APPLICATION FILED MAY 3, 1902.
NO MODEL. 2 SHEETS—SHEET 1.
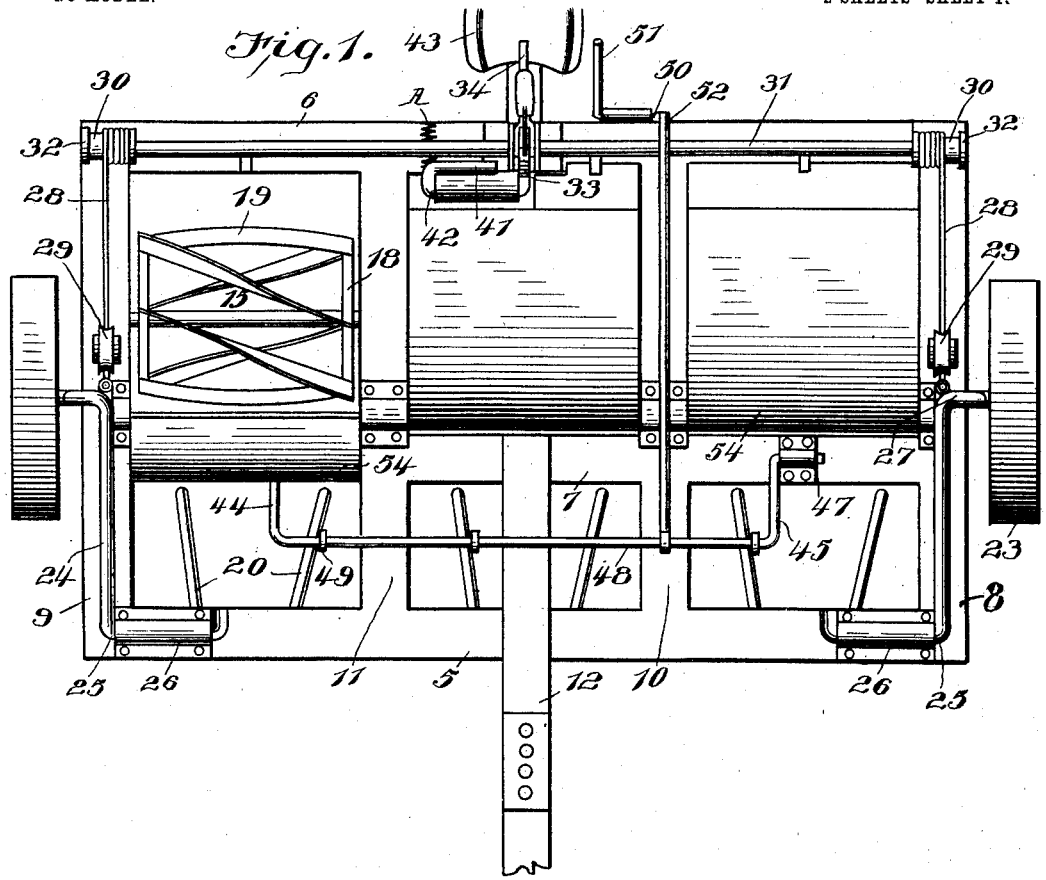
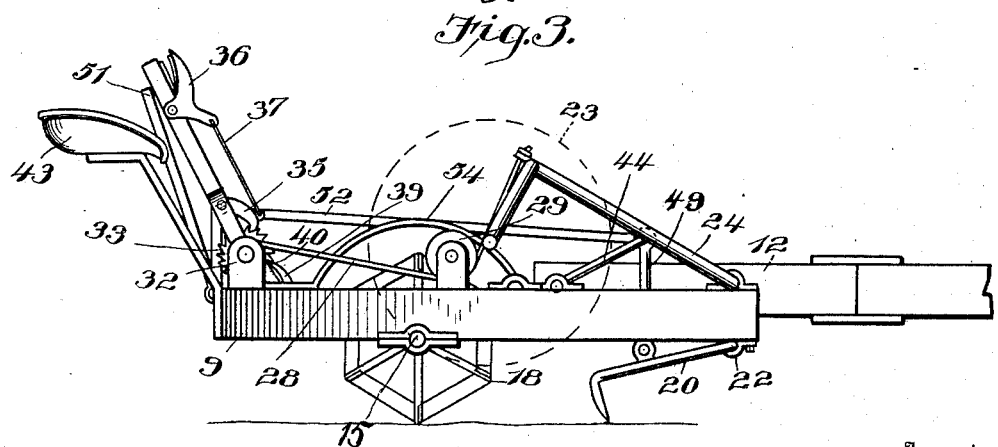
Witnesses
Inventor
J. W. Nutsch,
Attorneys No. 719,497. PATENTED FEB. 3, 1903.
J. W. NUTSCH.
STALK CUTTER.
APPLICATION FILED MAY 3, 1902.
NO MODEL. 2 SHEETS—SHEET 2.

Witnesses
T. P. Britt

Inventor
J. W. Nutsch,
By Chandler & Chandler
Attorneys

UNITED STATES PATENT OFFICE.

JOSEPH W. NUTSCH, OF MORROWVILLE, KANSAS.

STALK-CUTTER.

SPECIFICATION forming part of Letters Patent No. 719,497, dated February 3, 1903.

Application filed May 3, 1902. Serial No. 105,823. (No model.)

*To all whom it may concern:*

Be it known that I, JOSEPH W. NUTSCH, a citizen of the United States, residing at Morrowville, in the county of Washington, State of Kansas, have invented certain new and useful Improvements in Stalk-Cutters; and I do hereby declare the following to be a full, clear, and exact description of the invention, such as will enable others skilled in the art to which it appertains to make and use the same.

This invention relates to means or implements for cutting or chopping stalks; and it has for its object to provide an implement having means for straightening up the stalks in advance of the chopping-wheels, so that the blades of the wheels will engage the stalks transversely, a further object of the invention being to provide simple and efficient means for raising and lowering the straightening-arms and for raising and lowering the frame to lift the chopping-wheels or to lower them into active position.

Other objects and advantages of the invention will be understood from the following description.

Figure 2:
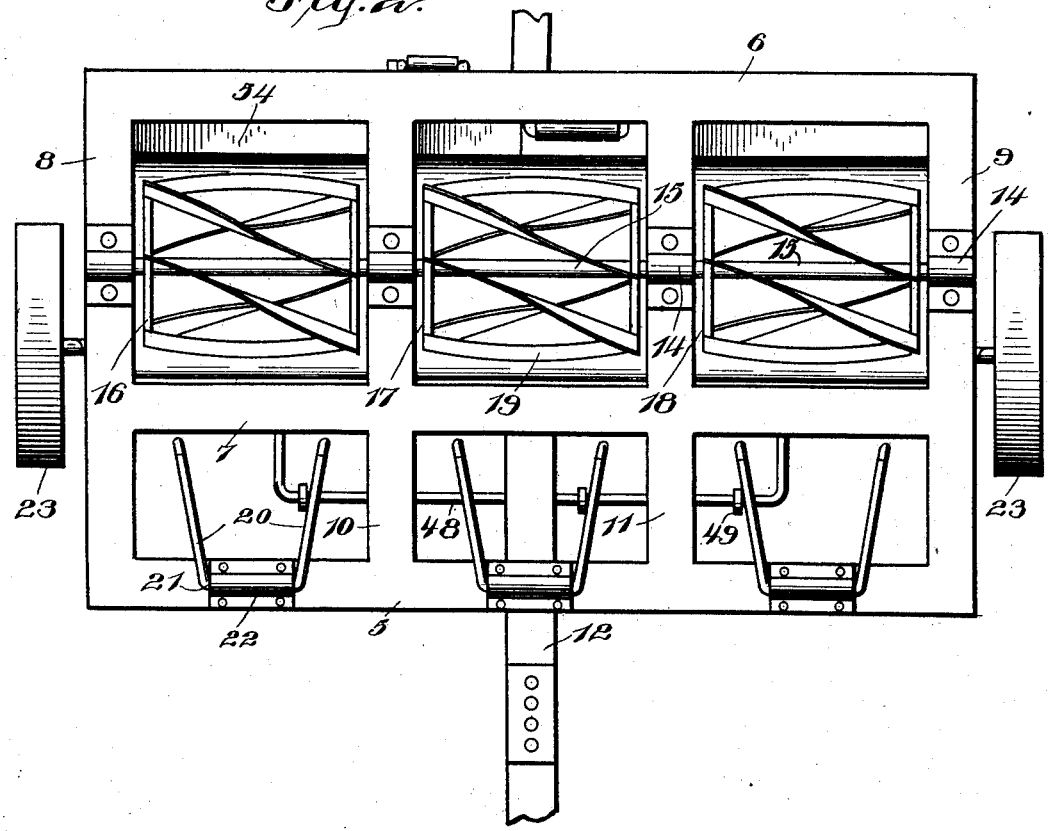
Figure 4:
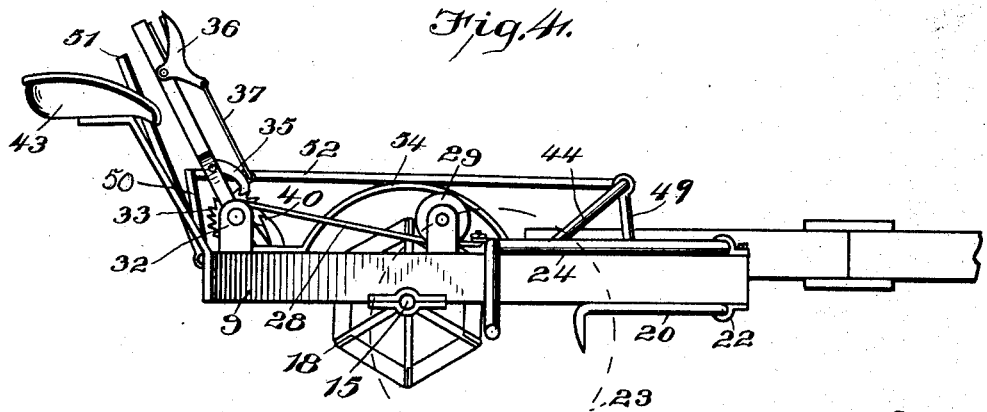

In the drawings forming a portion of this specification, and in which like numerals of reference indicate similar parts in the several views, Figure 1 is a top plan view of the implement, one of the chopping-wheel covers being raised to disclose the chopping-wheel. Fig. 2 is a bottom plan view of the implement. Fig. 3 is an end elevation of the implement, the wheel at the rear end of the implement which supports the frame being removed and its position indicated in dotted lines. Fig. 4 is a view similar to Fig. 3, showing the straightening-arms and chopping-wheels out of active positions.

Referring now to the drawings, the present implement comprises a frame including the front sill 5, rear sill 6, and intermediate sill 7, said sills being connected by the end beams 8 and 9 and the intermediate beams 10 and 11, there being provided also a draft-beam 12, which is secured upon the beams 5 and 7 intermediate of their ends and to which the tongue is connected.

On the under faces of the beams 8, 9, 10, and 11 are bearing-boxes 14, in which is mounted the chopper-shaft 15, and on this shaft are secured the three chopping-wheels 16, 17, and 18. Each of the chopping-wheels consists of two spaced spiders fixed to the shaft and the arms of which are displaced angularly with respect to each other, and to the ends of the arms of the spider are connected the cutting or chopping blades 19, which are bent to progress helically of the shaft. As the implement is drawn over the ground these chopping-wheels engage the stalks successively with their knives and effect the fine division of the stalks.

To secure the most efficient chopping of the stalks, they should of course lie in the direction of the progress of the machine or approximately thereto, and to thus position or straighten up the stalks straightening-arms or hooks are provided. These arms are formed in pairs of a single bar, the bar being bent to form the spaced arms 20 and the connecting portion 21, the portion 21 being engaged in a bearing 22 on the under side of the sill 5, while the free ends of the arms are bent downwardly to form hooks, as shown. As the implement progresses the hooks engage the stalks, and as the hooks are separated by interspaces greater than the lengths of the stalks the hooks will drag the stalks into approximately parallel relations.

A wheel 23 is provided for each end of the frame of the implement, and each of these wheels is mounted upon the laterally-extending end of a lever or hanger 24. Each of the hangers from the wheel extends upwardly, then laterally at right angles over the adjacent outside beam of the implement-frame, then forwardly to a point above the sill 5, and then laterally, as shown at 25, the laterally-extending portion 25 being pivotally engaged in bearings 26 on the upper face of the sill 5. Beyond the bearings the portion 25 of the hanger, as shown, is turned laterally to prevent withdrawal of said portion from the bearings. To the portions 27 of the hangers, which lie transversely of the end beams, are attached chains or cables 28, which are taken downwardly and under pulley-wheels 29, mounted upon the end beams, and are then taken rearwardly and secured to drums 30 on the winding-shaft 31, which is mounted in bearings 32 on the rear sill 6 of the implement-frame. A ratchet-wheel 33 is fixed upon the central portion of the drum-shaft, and mounted pivotally upon the drum-shaft and at opposite sides of the ratchet-wheel are the arms of a bifurcated rock-lever 34. The lever 34 has a pawl 35 pivoted between the arms thereof in position to engage the ratchet-wheel when the lever is moved in one direction and rotate the ratchet-wheel and therewith the drum-shaft and its drums. An angular lever 36 is mounted adjacent to the handle of the rock-lever and is connected by the pitman 37 with the pawl for reciprocating the rod or pitman to move the pawl into and out of engagement with the ratchet-wheel. Thus by rocking the rock-lever the drums will be rotated to wind the chains or cables thereon and the wheels will be moved downwardly, so that the frame of the implement will be raised to lift the chopping-wheels from the ground to facilitate transportation of the implement without dulling the blades of the wheels. To prevent returned rotation of the drum-shaft when released by the pawl in the act of rotating the drums, a retaining-pawl 39 is employed and consists of a bar bent in substantially rectangular form and having its sides separated at one corner to form a knife-edge 40 and a foot-piece 41. The side 42 of the rectangular bar opposite to the foot-piece is mounted in a bearing on the rear sill in position to insure movement of the knife-edge into and out of engagement with the ratchet. The retaining-pawl is held in engagement by spring A and may be thrown out of engagement by the foot of the operator, who sits in the seat 43, mounted on the sill 6.

It is of course necessary that the straightening-arms be raised also when the implement is transported, and for this purpose a U-shaped bar has the ends of its arms 44 and 45 bent laterally and mounted in bearings 46 and 47 on the upper face of the sill 7, and the connecting portion 48 between the arms of this U-shaped bar is connected, by means of links 49, with one of each pair of straightening-arms. A bell-crank lever 50 is mounted upon the rear sill 6, and the handle end 51 thereof lies in close proximity to the seat, so that it may be readily rocked by the occupant of the seat, and the opposite end of the bell-crank lever is connected by a rod 52 with the connecting central portion 48 of the U-shaped bar. Thus when the rock-lever is operated the U-shaped bar is rocked to raise and lower the straightening-arms.

To prevent all danger of a driver coming in contact with the chopping-wheels, a cover 54 is provided for each of the chopping-wheels and has trunnions mounted in bearings on the cross-beams of the implement-frame adjacent to the intermediate sill of the latter. The covers are arc-shaped or semicylindrical and are adapted to rest with their rear edges upon the rear sill 6, in which position they are held by suitable latches or turn-buttons.

It will be seen from the above description that with the present implement the stalks will be lined up and chopped and that when the machine is to be turned or to be transported or for any other reason it is desired to lift the chopping-wheels and straightening-arms above the ground this may be done without the necessity of the operator leaving his seat. In practice it will be understood that modifications of the specific construction shown may be made and any suitable materials and proportions may be used for the various parts without departing from the spirit of the invention.

What is claimed is—

1. A chopping implement comprising a frame having chopping-wheels, hangers pivoted to the front portion of the frame and extending rearwardly, then outwardly and then downwardly at the sides of the frame and having supporting-wheels at their last-named portions, a shaft mounted upon the frame and having winding-drums, direction-pulleys upon the frame, suspension-cables attached to the hangers and to the winding-drums and passed under the direction-pulleys, and means for rotating the shaft to wind the cables upon the drums and raise the frame with the chopping-wheels.

2. A chopping implement comprising a frame having chopping-wheels journaled to the under side thereof, hangers pivoted to the forward portion of the frame and extending rearwardly, then outwardly, then downwardly, then outwardly the second time to form axles upon which are mounted supporting-wheels, a shaft mounted upon the rear of the frame, and having winding-drums mounted thereon, pulleys mounted upon the sides of the frame, cables attached to the first-mentioned outwardly-turned portions of the hangers and passing beneath the pulleys and attached to the winding-drum, and means for rotating the shaft to wind the cables on the drums.

In testimony whereof I affix my signature in presence of two witnesses.

JOSEPH W. NUTSCH.

Witnesses:
 FRED POWELL,
 PAUL J. LOCH.